United States Patent [19]

Russell et al.

[11] Patent Number: 5,394,057

[45] Date of Patent: Feb. 28, 1995

[54] PROTECTIVE METAL SILICATE COATING FOR A METAL HALIDE ARC DISCHARGE LAMP

[75] Inventors: Timothy D. Russell, Cleveland Heights; Curtis E. Scott, Mentor; Charles N. Stewart, Chagrin Falls; Ranajit K. Datta, Cleveland; Mary S. Kaliszewski, Cleveland Heights; Paul G. Mathews, Chesterland, all of Ohio

[73] Assignee: General Electric Company, Schenectady, N.Y.

[21] Appl. No.: 927,105

[22] Filed: Aug. 7, 1992

[51] Int. Cl.⁶ .................. H01J 61/35; H01J 17/16
[52] U.S. Cl. .................... 313/635; 313/637; 313/638; 220/2.1 R
[58] Field of Search ............ 313/573, 634, 635, 637, 313/638, 639; 428/428; 220/2.1 R

[56] References Cited

U.S. PATENT DOCUMENTS

| | | | |
|---|---|---|---|
| Re. 30,165 | 12/1979 | Mason et al. | 313/221 |
| 2,030,397 | 2/1936 | Reynolds | 176/122 |
| 2,568,459 | 9/1951 | Noel | 313/221 |
| 3,984,590 | 10/1976 | Mason et al. | 427/106 |
| 3,993,844 | 11/1976 | Kiger et al. | 428/428 |
| 4,047,067 | 9/1977 | Clausen | 313/221 |
| 4,256,988 | 3/1981 | Coaton et al. | 313/221 |
| 4,409,517 | 10/1983 | Van Der Sande et al. | 313/637 |
| 4,918,352 | 4/1990 | Hess et al. | 313/25 |
| 5,032,762 | 7/1991 | Spacil et al. | 313/635 |

FOREIGN PATENT DOCUMENTS 58-110956  6/1983  Japan.

*Primary Examiner*—Donald J. Yusko
*Assistant Examiner*—N. D. Patel
*Attorney, Agent, or Firm*—Edward M. Corcoran; Stanley C. Corwin

[57] ABSTRACT

An arc tube of fused silica for a metal halide arc discharge lamp including a fill for the arc tube comprised of a sodium halide, at least one additional metal halide, and an inert starting gas, the arc tube including a tube of fused silica having an inner wall defining an arc chamber, the inner wall of the tube having provided thereon a metal silicate coating which is vitreous and light-transmissive, and which is comprised of a silicate of at least one metal selected from the group consisting essentially of scandium, yttrium, and a rare earth element, and preferably which is the same metal as that of the at least one additional metal halide. Protection of the fused silica arc tube with the metal silicate coating reduces loss of the metallic portion of the fill by diffusion or reaction and corresponding buildup of free halogen in the arc tube.

3 Claims, 4 Drawing Sheets

PROTECTIVE METAL SILICATE COATING FOR A METAL HALIDE ARC DISCHARGE LAMP

BACKGROUND OF THE INVENTION

1. Field of the Invention

The present invention relates generally to high-intensity, metal halide arc discharge lamps having fused silica arc tubes filled with a mixture including sodium halides and at least one additional metal halide, and optionally mercury, and, more particularly, to a metal silicate coating present on the inner surface of the arc tube for extending the useful life of the lamp by reducing loss of the metallic portion of the fill by, for example, sodium ion diffusion through the fused silica arc tube or reaction of the metal halides with the fused silica arc tube, and a corresponding undesirable buildup of free halogen in the arc tube.

2. Background of the Art

Metal halide arc discharge lamps having a construction typical of this type of lamp are shown, for example, in U.S. Pat. Nos. 4,047,067 and 4,918,352 (electroded), and 5,032,762 (electrodeless), the disclosures of which are incorporated herein by reference. Metal halide lamps of this type generally contain a filling of light emitting metals including sodium, and rare earth elements in the form of halides, commonly the iodide, and optionally mercury, in arc tubes composed of, for example, fused silica, alumina, and crystalline synthetic sapphire.

The lifetime of such lamps is frequently limited, however, by the loss of the metallic portion of the metal halide fill during lamp operation due to sodium ion diffusion and/or reaction of the metal halides with the fused silica arc tube and the corresponding building of free halogen in the arc tube. The term "free halogen" as used herein refers to volatile forms of halogens and halides present at lamp operating temperatures and includes free halogen released as sodium ions diffuse through the arc tube wall, as well as free halides, i.e., halide reaction products of halogen with any of the various constituents of the fill.

The mobility of the sodium ion is such that the arc tubes are relatively porous to it and, during lamp operation, sodium will pass from the hot arc plasma through the arc tube wall to the cooler region between the arc tube and the outer jacket or envelope of the lamp and condense on the outer envelope and parts. The lost sodium is thus unavailable to the discharge and can no longer contribute its characteristic emission so that the light output gradually diminishes and the color shifts from white toward blue. The arc becomes constricted and, in a horizontally operating lamp particularly, may bow against the arc tube wall and soften it. Also, loss of sodium causes the operating voltage of the lamp to increase and it may rise to the point where the arc can no longer be sustained ending the life of the lamp.

An additional source of loss of the metallic portion of the fill during lamp operation and corresponding buildup of free halogen is the chemical reaction of metal halides in the fill with the silicon dioxide, $SiO_2$, of the inner surface of the fused silica arc tube which produces, for example, metal silicate crystals and silicon tetraiodide. This results in a color shift in the lamp, wall darkening, and lumen loss.

Thus, the industry has been searching for ways to prevent or minimize sodium loss by diffusion through the fused silica arc tubes of metal halide arc discharge lamps, as well as to reduce or prevent reactions of the ionizable, light-emitting metal species in the fill with the fused silica walls of the arc tubes. Attempts to solve these problems have included providing aluminum silicate and titanium silicate layers on the outside surface of the arc tube (U.S. Pat. Nos. 4,047,067 and 4,017,163, respectively). U.S. Reissue Pat. No. 30,165 discloses vitreous metal phosphates and arsenates as coatings for the inner surfaces of ceramic and silica arc tubes. U.S. Pat. No. 3,984,590 discloses aluminum phosphates and U.S. Pat. No. 5,032,762 discloses beryllium oxide as coatings for the inner surfaces of arc tubes, the disclosures of all of the foregoing being incorporated herein by reference.

Despite the coating advances of the prior art, however, the problems of loss of the light-emitting, metallic portion of the fill by diffusion or reaction and the corresponding buildup of free halogen in the arc tube have not been heretofore satisfactorily solved.

Accordingly, it is an object of the present invention to provide means for reducing loss by diffusion and/or reaction of the metallic portion of the fill of an arc tube of a metal halide arc discharge lamp and hence reducing corresponding buildup of free halogen thereby extending the useful life of the lamp.

It is another object of the present invention to provide an improved arc tube and an improved metal halide discharge lamp including the improved arc tube having the aforesaid means.

SUMMARY OF THE INVENTION

These and other objects of the present invention are accomplished by providing an improved arc tube or chamber of fused silica for an arc discharge lamp such as a metal halide arc discharge lamp including a fill for the arc tube capable of initiating and sustaining an electric arc discharge, wherein at least one component of the fill reacts with the fused silica or diffuses through the arc tube. The fill will generally comprise a sodium halide, at least one additional metal halide, and an inert starting gas, the arc tube comprising a tube of fused silica having an inner wall defining an arc chamber, the inner wall of the tube having provided thereon a metal silicate coating which is vitreous and light-transmissive, and which is comprised of a silicate of at least one metal selected from the group consisting essentially of scandium, yttrium, and a rare earth element. The metal silicate coating has been found to effectively extend the useful life of metal halide arc discharge lamps by reducing loss of the metallic portion of the fill by diffusion and/or reaction, and by reducing corresponding buildup of free halogen. In a broader sense the invention relates to a fused silica article having a coating or zone of such metal silicate on at least a portion of a surface thereof.

The present invention additionally provides a metal halide arc discharge lamp assembly, comprising an arc tube of fused silica for containing a plasma arc discharge and having a metal silicate coating provided on the inner surface of the arc tube, the metal silicate coating being vitreous and light-transmissive, and being comprised of a silicate of at least one metal selected from the group consisting essentially of scandium, yttrium, and a rare earth element, a fill disposed in the arc tube and including a sodium halide, at least one additional metal halide, and an inert starting gas, and means for starting and sustaining an arc discharge. In most cases, mercury will also be a component of the fill. However, as those skilled in the art know, high intensity discharge electrodeless lamps which operate by radio or microwave frequency often contain little or no mercury (essentially mercury free) in the fill or arc tube.

The present invention additionally provides the process of protecting a fused silica arc tube of a metal halide arc discharge lamp, which contains a fill including sodium halide, at least one additional metal halide, and an inert starting gas disposed within the arc tube, from loss of the metallic portion of the fill by diffusion or reaction and a corresponding buildup of free halogen in the arc tube. The process comprises providing the inner surface of the arc tube with a metal silicate coating which is vitreous and light-transmissive, and which is comprised of a silicate of at least one metal selected from the group consisting essentially of scandium, yttrium, and a rare earth element.

DETAILED DESCRIPTION

The "metal silicate coating" of the present invention is, in fact, a light-transmissive, glassy region or zone in the inner wall of the fused silica arc tube. The glassy region or zone comprises a silicate of a metal contained in the fill which will react with the $SiO_2$ of the fused silica arc tube in the absence of the layer, for example, a silicate of scandium, yttrium, a rare earth element or mixtures thereof. In particular, the glassy region or zone (hereinafter "metal silicate coating") is vitreous, i.e., amorphous, is preferably substantially continuous, and preferably has a thickness sufficient to reduce sodium loss from the metal halide fill and/or reduce reaction of the metal species in the fill contained in the arc tube with the $SiO_2$ of the arc tube wall, and hence reduce corresponding buildup of free halogen from these sources, thereby extending the useful life of the lamp. Furthermore, the protective layer is sufficiently thin so as to allow only minimal blockage of visible light output from the arc tube. Generally, the thickness ranges between about 2 to about 30 micrometers.

Preferably, the metal silicate coating is comprised of a silicate of the metal or metals of the fill which are most reactive with the fused silica. Thus, for example, when the fill includes scandium iodide and thorium iodide, the metal silicate coating is preferably scandium silicate because scandium iodide is more reactive with the fused silica than thorium iodide. This advantageously reduces any tendency for metal exchange reactions between the various metals in the fill. That is, for example, if the metal silicate coating is thorium silicate, there would be a tendency for a scandium for thorium metal exchange reaction to occur in the thorium silicate coating.

Preferably the metal silicate coating has a thickness sufficient to reduce loss of the metallic portion of the fill by diffusion or reaction and a corresponding buildup of free halogen in the arc tube. Most preferably, the metal silicate coating has a thickness ranging from about 2 to about 30 micrometers. Most preferably, the metal silicate coating is continuous.

The arc tube is made of fused silica, i.e., a vitreous, light-transmissive material containing at least 96 weight % $SiO_2$. As used herein, fused silica materials include fused quartz materials made by fusing naturally occurring quartz sand, as is known to those skilled in the art, as well as synthetic non-crystalline quartz and VYCOR. The lamp is filled with a fill including halides of sodium and at least one additionally ionizable, light-emitting metal, such as scandium, yttrium or a rare earth, as is known to those skilled in the art, along with an inert starting gas, such as xenon and argon.

Figure 1:
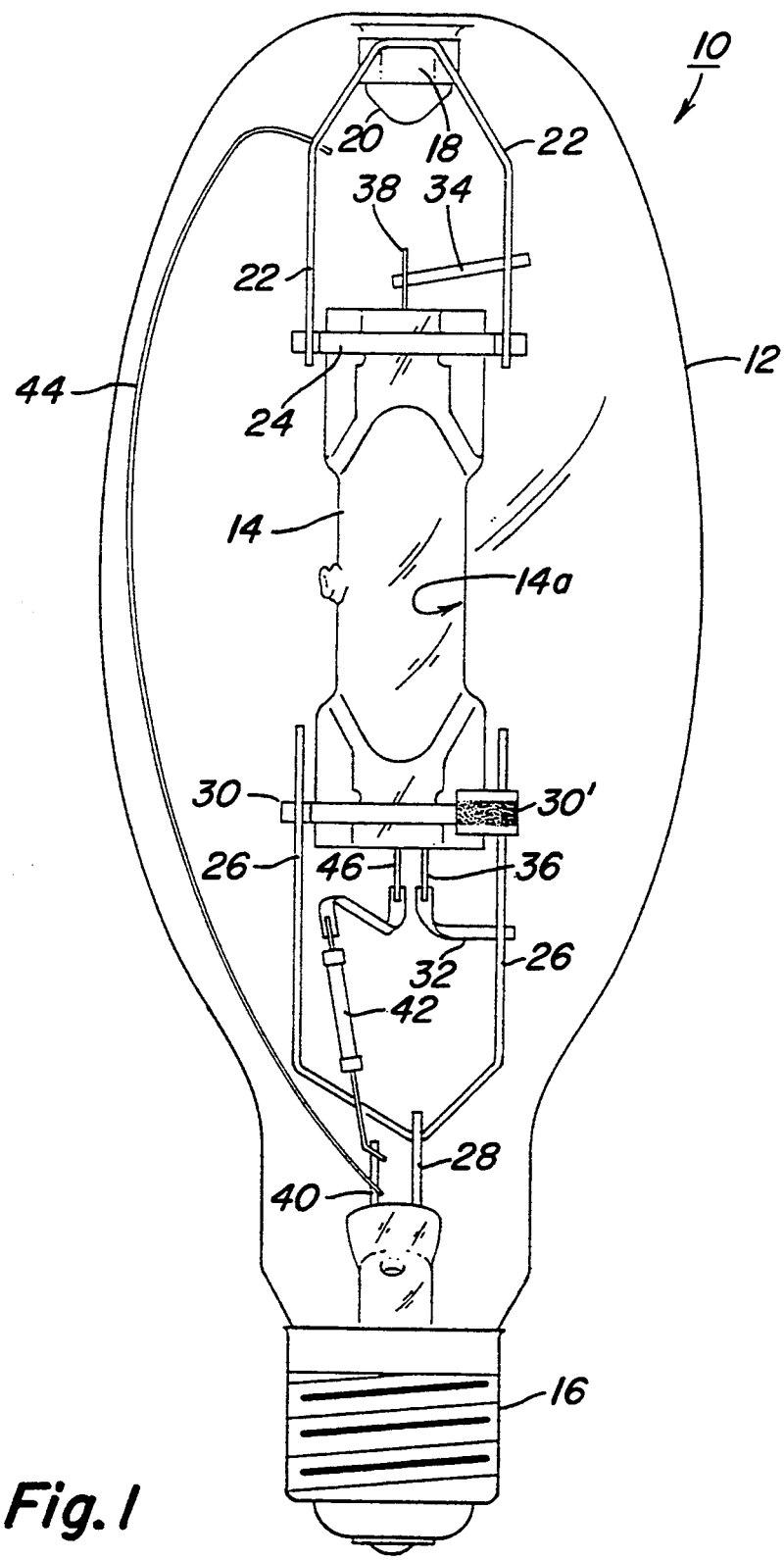
FIG. 1 schematically illustrates a high-intensity, metal halide discharge arc lamp including a metal silicate coating according to the present invention.

FIG. 1 is a schematic view of an illustrative but non-limiting embodiment of an electroded metal halide arc discharge lamp disclosed in U.S. Pat. No. 4,918,352 and useful in the practice of the present invention. Lamp 10 includes an outer envelope 12, made of a light-transmissive vitreous material, such as glass, a light-transmissive arc tube 14 made of light transmissive, fused silica, and a base 16 having suitable electrical contacts for making electrical connection to the arc tube. While FIG. 1 shows an electroded lamp, the invention may additionally be practiced on an electrodeless metal halide arc discharge lamp as is known from, for example, U.S. Pat. No. 5,032,762, the disclosure of which is incorporated herein by reference.

In FIG. 1, arc tube 14 is held in place within envelope 12 by frame parts comprising, at one end of the arc tube, a spring clip metal band 18 surrounding a dimple 20 in the envelope to which is attached by spot welding support member 22 which is also spot welded to strap member 24 which is securely mechanically fastened about the pinch seal region of arc tube 14. The other end of the arc tube is secured by support member 26 which is spot welded at one end to electrically conductive terminal 28 and welded at the other end to strap member 30 which is securely mechanically fastened about the other pinch seal region of the arc tube. Conductive members 32 and 34 are spot welded at one end to support members 26 and 22, respectively, and at the other end to inleads 36 and 38, respectively, of the respective arc tube electrodes (not shown). Electrically conductive member 40 is spot welded to starting resistor 42 and current conductor 44. The other end of resistor 42 is connected to the inlead 46 of a starting electrode (not shown). Except for conductor 44 and inleads 36, 38 and 46 which are made of molybdenum and the actual resistor portion of resistor 42, all of the frame parts may be made of a nickel-plated steel. The lamp also contains a getter strip 30' coated with a metal alloy material primarily to getter or absorb hydrogen from inside the lamp envelope.

In accordance with the present invention, a metal silicate coating 14a is applied to the inner surface of arc tube 14 and is amorphous. Preferably the metal silicate coating 14a has a sufficient thickness to reduce loss of the metallic portion of the metal halide fill by diffusion of sodium and/or by reaction of the metal halides and the silica of the arc tube wall, and hence reduce a corresponding buildup of free halogen. In addition, the metal silicate coating 14a must be sufficiently thin to allow only minimal blockage of visible light output from the arc tube. Since the metallic portion of the fill generates the visible radiation during lamp operation, the useful life of the lamp is advantageously extended by reducing loss thereof. Furthermore, since a buildup of free halogen typically causes arc instability and eventual arc extinction, reducing such a buildup likewise extends the useful life of the lamp.

In a preferred embodiment of the present invention, arc tube 14 is comprised of fused silica and the metal silicate coating is a glassy zone or region comprising scandium silicate. Scandium silicate is a preferred metal silicate coating material because it has a relatively low thermal expansion coefficient and a high melting point. A preferred thickness for the metal silicate coating 14a ranges between 2 to 30 micrometers.

The coating can be applied to the interior wall of the arc tube as a coating of metal oxide, a coating of metal oxide precursor, or as a coating of pre-reacted metal silicate. Any of several known methods may be employed including coating from a metal alkoxy sol gel with thermal conversion to the oxide, from a suspension of finely divided metal oxide in a carrier liquid, from a solution or suspension of a precursor followed by conversion of the precursor into the oxide, from a powder or frit of the oxide or silicate, or by chemical vapor deposition (CVD) of a precursor, such as a metal acetyl acetonate, with pyrolytic decomposition of the precursor into the metal oxide. Coating by atmospheric or low pressure CVD is preferred and these techniques are well known in the art. These coatings are then fused into the interior wall of the silica arc tube using, for example, a flame, to form a substantially continuous zone of metal silicate within the silica of the interior wall.

For example, a precursor, such as scandium acetyl acetonate, may be deposited by chemical vapor deposition, atmospheric or low pressure, with pyrolytic decomposition at a temperature of about 300° C. to form a coating of scandium oxide, $Sc_2O_3$. Then, the scandium oxide is fused into the silica at a temperature of about 1800° C. to form a zone of glassy scandium silicate. Alternately, scandium oxide may be deposited from a suspension thereof, dried, and fused into the silica at a temperature of about 1800° C. The coating could also be applied as a pre-reacted scandium silicate powder or frit which is then fused into the silica inner wall of the arc tube.

The "metal silicate coating", i.e., region or zone, can be characterized by several techniques. After the coating material is fused into the silica, visually the glass is transparent. X-ray analysis of these surfaces shows only an amorphous structure indicating little or no crystalline phase. If the "fused-in" structure were crystalline one would expect distinct X-ray diffraction patterns. The total amount of metal silicate, e.g., scandium silicate, in the glassy region of the arc tube wall can be determined by dissolving the glass and measuring concentrations by techniques such as ICP (inductive coupled plasma) spectroscopy. The presence of the metal silicate can also be detected by using a scanning electron microscope equipped with an EDX analysis system to produce an EDX dot map of the metal silicate fused into the fused silica wall. Thus, the thickness of the region may be determined from edge fracture surfaces of the region using an EDX dot mapping technique, as is known in the art, or by any other suitable technique. Typical thicknesses for the region were found to range from 2–30 m. Thickness will depend on the amount of initial oxide coated on the surface and fusion times/temperatures as is known in the art.

The above is intended to be illustrative, but non-limiting with respect to the practice of the invention. The invention will also be further understood by reference to the illustrative, but non-limiting example below.

EXAMPLE

Figure 3:
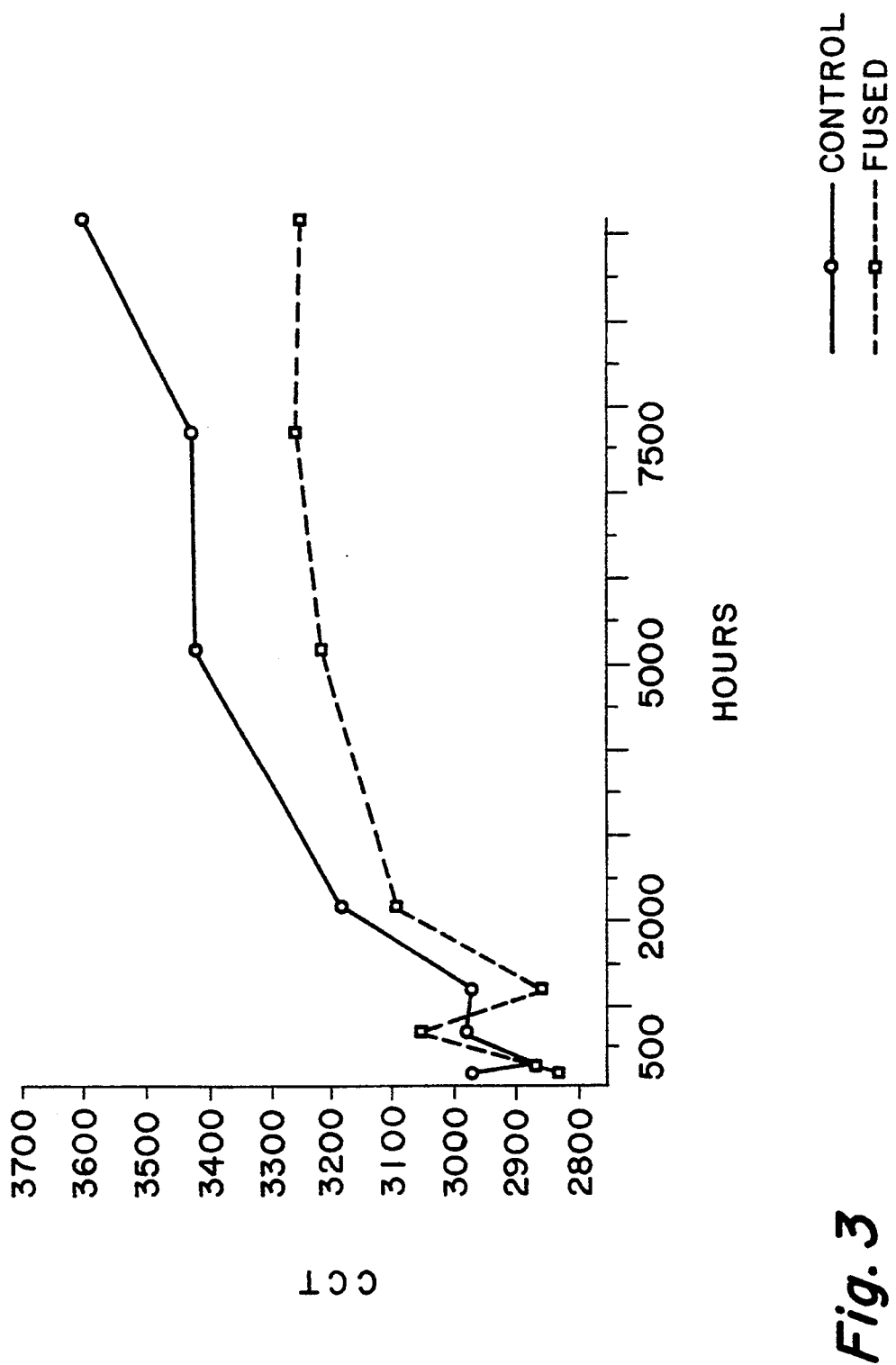
FIG. 3 shows changes in color temperature over a 10,000 hour test for the lamps of FIG. 2.
Figure 4:
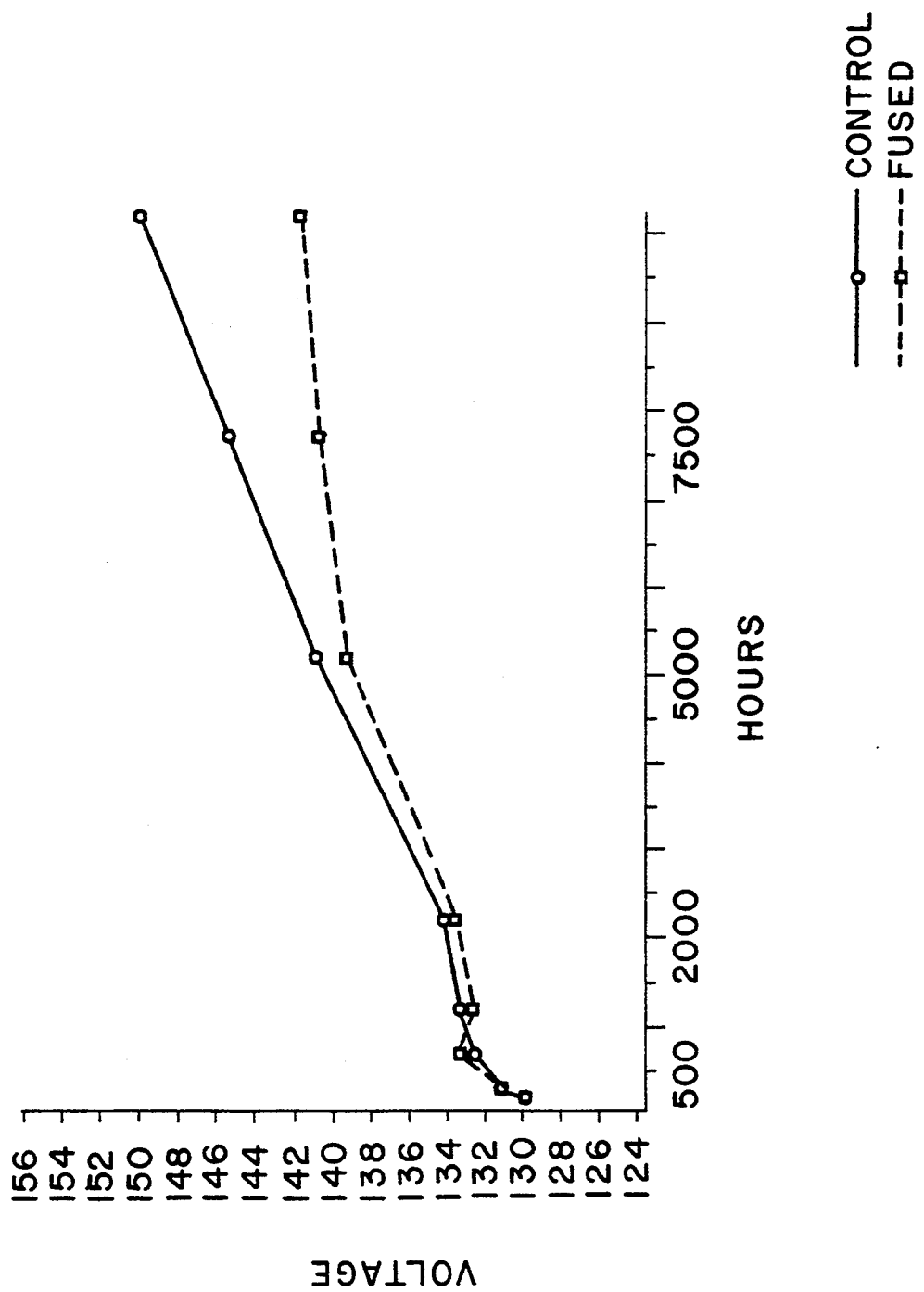
FIG. 4 shows changes in voltage over a 10,000 hour test for the lamps of FIG. 2.

Scandium oxide, $Sc_2O_3$, was applied to the interior surfaces of fused quartz arc tubes by atmospheric chemical vapor deposition and pyrolytic decomposition of a precursor, namely, scandium acetyl acetonate. The scandium oxide coatings were then fused into the silica to provide a "metal silicate coating" in accordance with the invention by heating the tubes to a white heat of about 1800° C. These tubes, along with uncoated controls, were processed into 175 watt, metal halide arc discharge lamps of the type disclosed in U.S. Pat. No. 4,918,352. The fills were a mixture of mercury, sodium iodide, scandium iodide, thorium iodide, and argon as starting gas. The lamps were operated and tested out to 10,000 hours. The effects of the coating on lamp performance are demonstrated in FIGS. 2–4.

Figure 2:
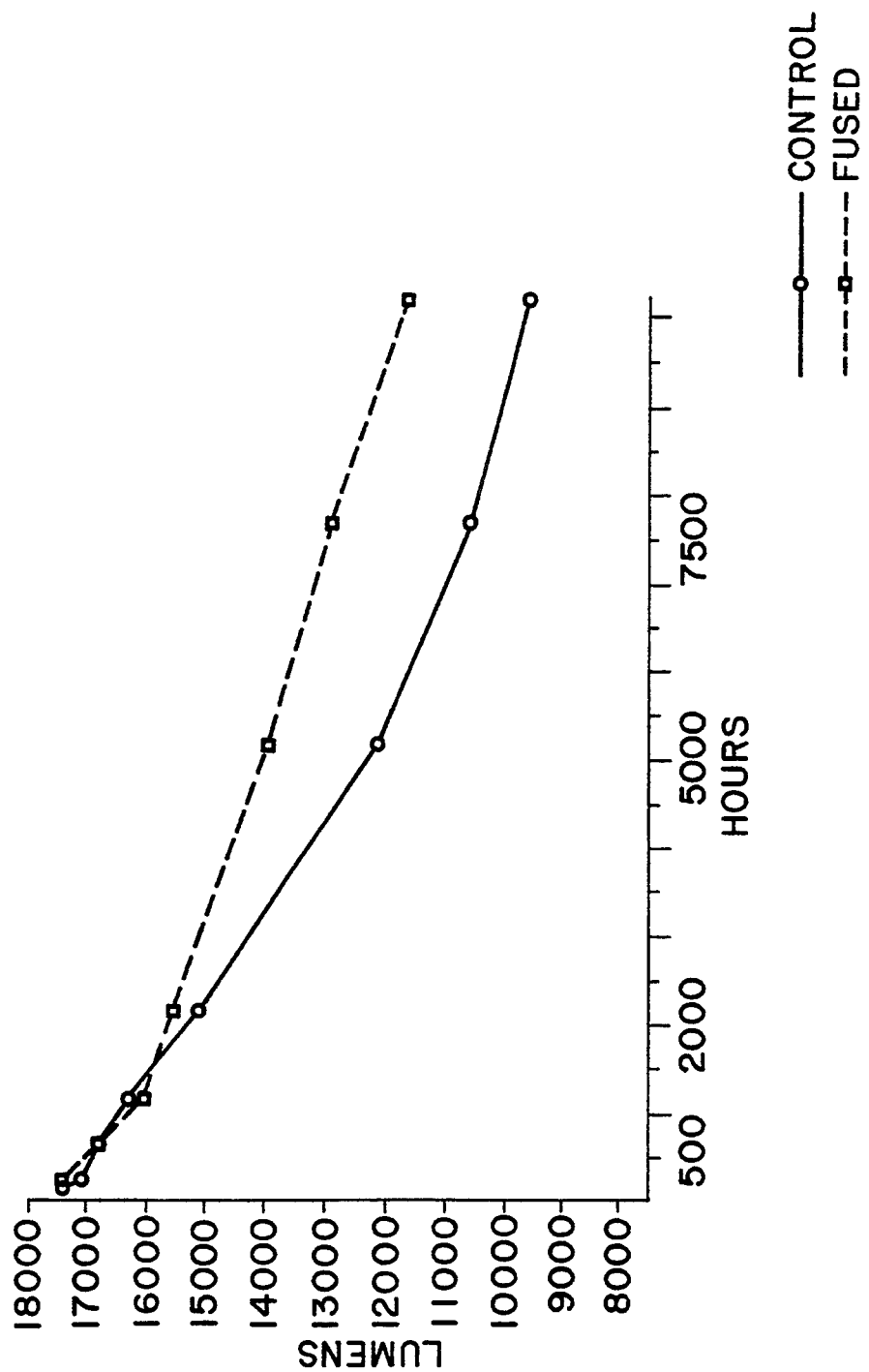
FIG. 2 compares the light output of a lamp having a metal silicate coating according to the present invention with a control over a 10,000 hour test.

FIG. 2 shows improved lumen maintenance for the coated lamps according to the invention compared to the uncoated controls. At 10,000 hours of operation, coated arc tube lamps averaged approximately 25% more lumens. Similarly less change in color temperature (FIG. 3) and voltage (FIG. 4) over the 10,000 hour test was observed for lamps using the coated arc tubes according to the invention. For example, after 10,000 hours of burning, the average color temperatures for the lamps made from coated and fused arc tubes according to the invention advantageously averaged 350° C. lower than controls (3250 K vs. 3600 K). The voltage increased only +7% during the 10,000 hour test for the coated arc tubes compared to almost +15% for the controls.

The improved performance appears to be related to reduced sodium loss and reduced reaction of metal species in the fill with the interior wall of the arc tube during lamp life as suggested by both the voltage and color temperature data.

Finally, the survival rate for the inventive test lamps with coated arc tubes was found to be 50% better than that for the controls. The inventive lamps showed no lamp failures during testing whereas 50% of the control lamps failed by 10,000 hours.

Free halogen was determined by ultraviolet absorption spectroscopy as is known in the art. Lamps according to the invention had a free halogen level reduced by a factor of two to four times compared to the uncoated lamps, with an average reduction by a factor of three times. The inventive glassy metal silicate coatings are thus effective for reducing free halide. When examined by X-Ray diffraction, moreover, no crystalline pattern from $Sc_2O_3$ was observed so that the scandium silicate coatings were amorphous.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A metal halide arc discharge lamp assembly, comprising:

an arc tube of fused silica for containing a plasma arc discharge, having a scandium silicate coating fused to the inner surface of the arc tube, the scandium silicate coating being vitreous and light-transmissive;

a scandium iodide fill disposed in the arc tube and including a sodium halide, at least one additional metal halide, and an inert starting gas;

and means for starting and sustaining an arc discharge.

2. The process of protecting a fused silica arc tube of a metal halide arc discharge lamp, which contains a fill including sodium halide, at least scandium iodide, and an inert starting gas disposed within the arc tube, from loss of the metallic portion of the fill by diffusion or reaction and corresponding buildup of free halogen in the arc tube, the process comprising:

fusing to the inner surface of the arc tube a scandium silicate to form a vitreous and light-transmissive coating.

3. An arc tube of fused silica for a metal halide arc discharge lamp including a fill for the arc tube comprised of a sodium halide, at least one additional metal halide, and an inert starting gas, the arc tube comprising a tube of fused silica having an inner wall defining an arc chamber and a scandium silicate fused to the inner wall of the tube.

* * * * *